United States Patent [19]
Wolczko et al.

[11] Patent Number: 6,078,744
[45] Date of Patent: Jun. 20, 2000

[54] METHOD AND APPARATUS FOR IMPROVING COMPILER PERFORMANCE DURING SUBSEQUENT COMPILATIONS OF A SOURCE PROGRAM

[75] Inventors: Mario I. Wolczko; David M. Ungar, both of Palo Alto, Calif.

[73] Assignee: Sun Microsystems, Palo Alto, Calif.

[21] Appl. No.: 08/905,294

[22] Filed: Aug. 1, 1997

[51] Int. Cl.[7] ........................................ G06F 9/45
[52] U.S. Cl. .................. 395/705; 395/704; 395/709; 364/148.01
[58] Field of Search .................. 395/702, 703, 395/705, 707, 709, 704; 364/757, 726.2, 721.1, 148.01; 702/80; 708/507

[56] References Cited

U.S. PATENT DOCUMENTS

| | | | |
|---|---|---|---|
| 5,179,702 | 1/1993 | Spix et al. | 395/672 |
| 5,430,850 | 7/1995 | Papadopoulos et al. | 395/683 |
| 5,471,593 | 11/1995 | Branigin | 395/582 |
| 5,794,005 | 8/1998 | Steinman | 395/500 |

OTHER PUBLICATIONS

Aho, A.V., et al., "Introduction to Compiling," (Chapter 1) and "Code Generation," (Chapter 9) in *Compilers: Principles, Techniques, and Tools*, Addison–Wesley Publishing Co., Reading, MA (1988).

Booch, G., "Elements of the Object Model," in *Object Oriented Design (with Applications)*, The Benjamin/Cummings Publishing Co., Inc., Redwood City, CA (1991).

Dean, J., and Chambers, C., "Towards Better Inlining Decisions Using Inlining Trials," 1994 ACM Conference on LISP and Functional Programming, Orlando, FL (Jun. 1994).

Hölzle, U., "Adaptive Optimization for Self: Reconciling High Performance with Exploratory Programming," a dissertation submitted to the Stanford University Dept. of Computer Science in partial fulfillment of the requirements for the degree of Doctor of Philosophy (1995).

Subhlok et al., "Optimal latency throughput tradeoffs for data parallel pipelines", SPAA, ACM, pp. 62–71, Jun. 1996.

Lain et al., "Compler support for hybrid irregular accesses on multicomputers", ICS ACM, pp. 1–9, Jul. 1996.

Mowry et al., "Design and evaluation of a compiler algorithm for prefetching", ASPLOS V, ACM, pp.62–73, Oct. 1992.

Carr et al., "Compiler optimization for improving data locality", ASPLOS VI, ACM, pp. 252–262, Oct. 1994.

Holzle and Ungar, "Optimizing dyanamically dispatched calls with run time feedback", SIGPLAN, ACM, Jun. 1994, pp. 326–336.

Holzle and Ungar, Reconciling responsiveness with performance in pure object oriented languages:, ACM Trans. on Prog. Lang. & Syst. vol. 18, No. 4, Jul. 1996, pp. 355–400.

Chambers et al., "A framework for selective recompilation in the presence of complex intermodule dependencies", ICSE'95 ACM, pp. 221–230, Jan. 1995.

Chambers and Ungar, "Making pure object oriented languages practical", OOPSLA'91, ACM, pp. 1–15, May 1991.

Dean et al., "Selective specialization for object oriented languages", SIGPLAN'95, ACM, pp. 93–102, Feb. 1995.

Dean and Chambers, "Towards better inlining decisions using inlining trials", LISP'94, ACM pp. 273–282, Mar. 1994.

Burke and Torczon, Interprocedural optimization: eliminating unnecessary recompilation:, ACM Trans. Prog. Lang. & Syst. vol. 15, No. 3, pp. 367–399, Jul. 1993.

*Primary Examiner*—Tariq R. Hafiz
*Assistant Examiner*—Anil Khatri
*Attorney, Agent, or Firm*—Park & Vaughan

[57] ABSTRACT

Apparatus, methods, and computer program products are disclosed for improving the performance of subsequent compilations of a source program. The initial compilation of the source program journals computationally expensive intermediate compilation data. Subsequent compilations, instead of recomputing this data, uses the intermediate compilation data from the journal. Thus the compiler has improved performance during subsequent compilations of the source program. One aspect of the invention applies to dynamic compilers to reduce the startup delay caused by compiling the source program when the program is invoked.

8 Claims, 8 Drawing Sheets

METHOD AND APPARATUS FOR IMPROVING COMPILER PERFORMANCE DURING SUBSEQUENT COMPILATIONS OF A SOURCE PROGRAM

BACKGROUND OF THE INVENTION

1. Field of the Invention

This invention relates to the field of computer programming languages. Specifically, this invention includes a method, apparatus, and computer program product for increasing a compiler's performance on subsequent compilations of a source program.

2. Background

Compilers are programs that execute in a computer to transform a source program represented in one language (often in a human readable form) to an equivalent program in a target language. The target language is directed to an Application Binary Interface (ABI). The ABI is generally defined by the computer hardware and operating system. The computer uses the target language to perform the operations specified by the source program. Sometimes the ABI is defined for an abstract environment called a virtual machine. An implementation of a virtual machine is a program, that executes on the hosting computer, that implements an ABI other than the hosting computer's ABI.

Many compilers provide an optimization capability that evaluates the structure of the source program to improve the execution speed of the compiled program when the computer executes the target language. The compiler's optimization operations are often compute intensive. Thus, enabling the compiler's optimization features generally increases the time required to compile the source program. This increased compilation time increases the time required for a developer to change and compile the source program, and test the program resulting from the target language—thus lengthening the program's development cycle.

During most of the program development process, only a small portion of the source program changes between subsequent compilations. However, prior art program development systems often recompile unchanged portions of a source program during subsequent compilations. Although many program development systems detect when a given source module needs to be compiled, a change in only one compilable unit in the source module still causes the entire module to be recompiled. A "compilation unit" is a portion of the source program that is compiled as a unit (for example, but without limitation, a function, method or procedure, or even a statement).

Many traditional static compilers generate the target language in the form of multiple object modules. The object modules are linked together to create an executable file that can be loaded into the computer's memory and executed without invoking the compiler. However, dynamic compilers compile the source program every time the program is executed. Thus as the program executes, uncompiled compilation units are compiled just prior to their first execution. This characteristic means that programming environments that use dynamic compilers have a longer program startup delay than do traditional programming environments using static compilers. This startup delay is a function of the performance of the compiler. To reduce the startup delay, most dynamic compilers do little if any optimizations during the program's startup period.

In addition, adaptive compilers (those dynamic compilers that optimize portions of the executing program depending on performance characteristics determined from run-time usage information) still need to perform the optimization function as rapidly as possible. Otherwise, the time required to optimize the compilation unit will be greater than the time saved by executing the optimized code.

Furthermore, it is difficult to debug a program that uses adaptive compilation because often the optimization decisions are not completely reproducible between separate executions of the program. Thus, mistakes in the compiler optimization code are very difficult to debug.

One prior art approach to improving the startup delay for a dynamically compiled program is to save a copy of the compiled program to disk—a core dump (for example as was done in the SELF programming environment). This allows the state of the executing program to be saved. Subsequent executions of the program, starting from the saved state, can be invoked by loading the core dump into the computer's memory and resuming execution of the program. The problem with this approach is that subsequent executions of the program may not have the same performance characteristics as the saved program. Therefor, the previous optimization decisions may no longer be valid. Yet another problem is that a core dump is executed on an identically configured computer/operating system combination. Thus, the core dump image may not be useable when the operating system is updated or if the core dump image is transferred from one computer to another.

To summarize, one problem with the prior art is that static compilers need improved performance to shorten the development cycle. Another problem is that dynamic compilers need high performance to reduce the startup delay for a dynamically compiled application. Another problem is that it is very difficult to recreate the state of a program executing with an adaptive compiler because the exact sequence of optimizations (which depends on run-time feedback) is difficult to recreate. Further, the prior art techniques used to improve the startup delay of a program compiled by an adaptive compiler (such as the core dump approach) are system dependent and not portable to other systems.

SUMMARY OF THE INVENTION

The present invention provides an apparatus, method, and computer program product for improving performance of a compiler during subsequent compilations of a source program. The invention operates by journaling computationally expensive intermediate compilation data that either determines or is a result of compilation decisions made by the compiler. The journaled information is then used during subsequent compilations instead of recomputing the computationally expensive intermediate compilation data.

One aspect of the invention is a computer controlled method for improving performance of a compiler. The method includes the steps of recompiling a source program, during a subsequent compilation and of using a first journaled datum in lieu of recreating an intermediate compilation datum associated with a specific compilation phase during the subsequent compilation.

Another aspect of the invention is an apparatus, including a central processing unit coupled to a memory, for compiling a source program by a compiler. The apparatus includes, within the compiler a recompilation mechanism configured to recompile the source program during a subsequent compilation. The apparatus also includes a journal utilization mechanism that uses a first journaled datum in lieu of recreating an intermediate compilation datum during the subsequent compilation.

Yet a further aspect of the invention is a computer program product embedded on a computer usable medium for causing a computer to compile a source program by a compiler. When executed on a computer, the computer readable code causes a computer to effect a recompilation mechanism and a journal utilization mechanism. Each of these mechanisms having the same functions as the corresponding mechanisms for the previously described apparatus.

The foregoing and many other aspects of the present invention will no doubt become obvious to those of ordinary skill in the art after having read the following detailed description of the preferred embodiments that are illustrated in the various drawing figures.

DESCRIPTION OF THE PREFERRED EMBODIMENTS

Notations and Nomenclature

The following 'notations and nomenclature' are provided to assist in the understanding of the present invention and the preferred embodiments thereof.

Adaptive compilation—Adaptive compilation extends dynamic compilation and JIT compilers by determining which compilation units of an executing program should be optimized (from usage data gathered while the program executes) and then optimizing those compilation units.

Compilation unit—A compilation unit is a portion of the source program that can be separately compiled. A compilation unit is dependent on the underlying design of the compiler processing the source program. Generally, a function, programmed-procedure, OOP method or statement are compilation units. The use of compilation unit for the invention indicates a portion of the source program that generates a journalable ICD. Thus, the compilation unit definition depends on the compiler phase and the source language.

Dynamic compilers—Dynamic compilers compile the source program while the program is executing. Some dynamic compilers have an optimization mode and a non-optimization mode. Static compilers (such as FORTRAN, Pascal, C, C++and other traditional computer language compilers) compile the source into a deterministic target language independent of the execution sequence and subject to user specified compilation preferences. A general discussion of static compilers can be found in *Compilers: Principles, Techniques and Tools* by Alfred V. Aho, Ravi Sethi and Jeffrey D. Ullman, Addison-Wesley Publishing Co. © 1988, ISBN 0-201-10088-6. A brief overview of dynamic compilers can be found at page 9 of *Adaptive Optimization for Self: Reconciling High Performance with Exploratory Programming*, by Urs Hölzle, Sun Microsystems Laboratories, SMLI TR-95-35, © 1995.

Interpreter—An interpreter is a program that implements a virtual machine that effectuates the ABI for the interpreted language. Any computer that is able to execute the virtual machine is able to execute a program compiled for the virtual machine's ABI.

Intermediate compilation data (ICD)—The intermediate compilation data (ICD) is transitory information that is developed by a compiler so that the compiler can make decisions (such as an optimization decision) based on the ICD. One example of an ICD is the data structure that represents an interference graph for determining variable usage. Another example of an ICD is the register assignments for the target computer that results from a compilation unit's processing of the variable interference graph. These examples show that the ICD can be used as input to a compiler decision. This approach could be used where the generation of the ICD is computationally expensive, but the decision based on the ICD is not. Another use for an ICD is to represent the results of a compiler decision—such as specific register assignments for a target ABI. Notice that the interference graph ICD is independent of the ABI whereas the specific register assignments are ABI dependent. Thus, the ICD may be ABI independent or ABI dependent. An ABI independent ICD does not change depending on the underlying ABI architecture. An ABI dependent ICD depends on the ABI architecture.

Intermediate representation—The intermediate representation is the representation of a source program that results after the source program has been processed by the compiler's front-end. The intermediate representation represents the structure and operations described in the source program but in a form that is efficiently processed in subsequent phases of the compiler.

Just-in-time compiler (JIT)—A JIT compiler converts a target language that is interpreted by a virtual machine, into a target language directed toward the ABI of the host computer. The JIT compiler compiles a method, a portion of a method, a statement or other source grouping just before the source grouping is first executed. Subsequent calls to the source grouping re-execute the compiled target language for the host computer's ABI.

Object oriented programming (OOP)—Object oriented programming is a methodology for building computer software. Objects contain data and OOP methods. OOP methods are procedures that generally access the object's data. The programmer using the object does not need to be concerned with the type of data in the object; rather, the programmer need only be concerned with creating the correct sequence of OOP method invocations and using the correct OOP method. Smalltalk, Java and C++are examples of OOP languages. Smalltalk was developed in the Learning Research Group at Xerox's Palo Alto Research Center (PARC) in the early 1970s. C++was developed by Bjarne Stroustrup at the AT&T Bell Laboratories in 1983 as an extension of C. Java is an OOP language with elements from C and C++and includes highly tuned libraries for the internet environment. Java was developed at SUN Microsystems and released in 1995. Further information about OOP concepts may be found in *Object Oriented Design with Applications* by Grady Booch, the Benjamin/Cummings Publishing Co., Inc., Redwood City, Calif., (1991), ISBN 0-8053-0091-0.

Procedure—A self-consistent sequence of steps leading to a desired result. These steps are those requiring physical manipulation of physical quantities. Usually these quantities take the form of electrical or magnetic signals capable of being stored, transferred, combined, compared, and otherwise manipulated. These signals are referred to as bits, values, elements, symbols, characters, terms, numbers, or the like. It will be understood by those skilled in the art that all of these and similar terms are associated with the appropriate physical quantities and are merely convenient labels applied to these quantities.

Source program—A source program is the data that is compiled by a compiler. Generally the source program is human-readable text. However, the Java compiler generates "bytecodes" that are a binary representation of the Java source. The "bytecodes" in turn can serve as a source program to a JIT compiler.

Static compiler—see "Dynamic Compiler."

Overview

The manipulations performed by a computer in executing opcodes are often referred to in terms, such as adding or comparing, that are commonly associated with mental operations performed by a human operator. In the present invention no such capability of a human operator is necessary in any of the operations described herein. The operations are machine operations. Useful machines for performing the operations of the invention include programmed general purpose digital computers or similar devices. In all cases the method of computation is distinguished from the method of operation in operating a computer. The present invention relates to method steps for operating a computer in processing electrical or other (e.g., mechanical, chemical) physical signals to generate other desired physical signals.

The invention also relates to apparatus for performing these operations. This apparatus may be specially constructed for the required purposes or it may comprise a general purpose computer as selectively activated or reconfigured by a computer program stored in the memory of a computer. The procedures presented herein are not inherently related to a particular computer or other apparatus. In particular, various general purpose machines may be used with programs written in accordance with the teachings herein, or it may prove more convenient to construct more specialized apparatus to perform the required method steps. The required structure for a variety of these machines will appear from the following description. Also, the invention may be embodied in a computer readable storage medium encoded with a program that causes a computer to perform the programmed logic.

One skilled in the art will understand that, although the figures and illustrations use a particular bit ordering within the computer memory word, the actual bit ordering is irrelevant to the invention. Further, one skilled in the art will understand that illustrations of data structures in memory start at the lower addressed memory at the top of the structure and extend to higher addressed memory.

Figure 1A:
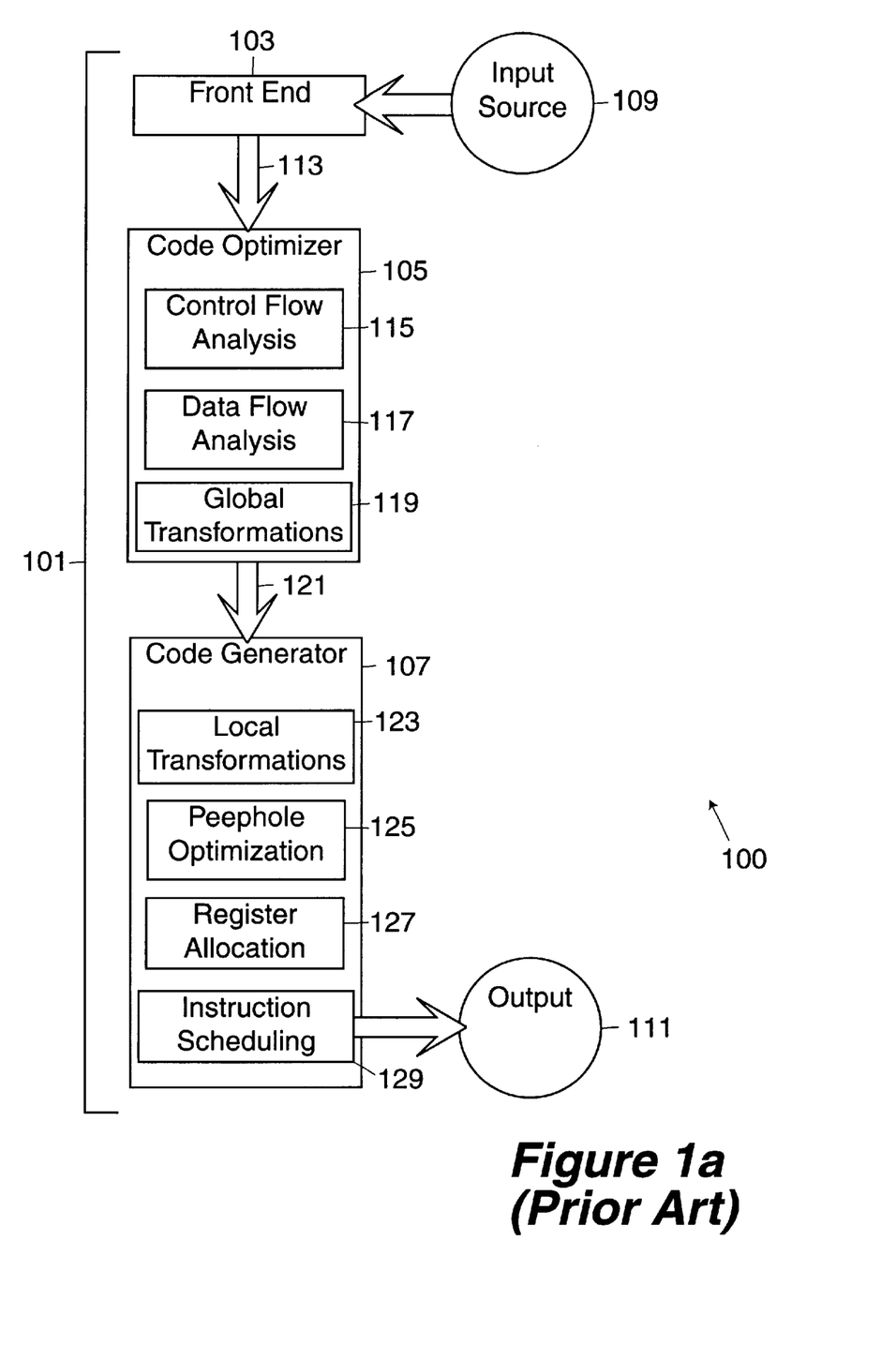
FIG. 1a & 1b illustrate the structure of a prior art static compiler (1a) and the operation of a dynamic compiler (1b)

FIG. 1a illustrates a static compiler environment, indicated by general reference character 100, that includes a compiler 101. The compiler 101 includes a front-end 103, a code-optimizer 105, and a code-generator 107. The compiler 101 processes a source program 109 to generate a target language 111. The front-end 103 of the compiler 101 initially processes the source program 109 and performs lexical, syntactical and semantical analysis of the source program 109. The front-end 103 generates a first intermediate code representation 113 of the source program 109. If the compiler 101 is an optimizing compiler that is currently conditioned to optimize the compiled code, the first intermediate code representation 113 is further processed by the code-optimizer 105.

The code-optimizer 105 includes a number of optimization phases such as a 'control flow analysis' phase 115, a 'data flow analysis' phase 117, and a global transformation phase 119. These phases 115, 117, 119 perform well-understood optimizations on the first intermediate code representation 113. The output from the code-optimizer 105 is an optimized intermediate code representation 121 that reflects the above optimizations. The optimized intermediate code representation 121 is provided to the code-generator 107. The code-generator 107 also includes a number of optimization phases that operate on the optimized intermediate code representation 121. These optimizations often include a 'local code transformation' phase 123, a 'peephole optimization' phase 125, a 'register allocation' phase 127, and an 'instruction scheduling' phase 129. The code-generator 107 generates code that is executable by the ABI supported by the compiler 101. Many of the phases in the code-generator 107 are dependent on the architecture of the target ABI. In a static compiler, the target language is often output as an object file that will be linked with other object files and object libraries to create an executable image file. Dynamic compilers will replace interpreted code with the newly compiled code to optimize the performance of the executing program. One skilled in the art will understand that some compilers do not include all of the phases described above and that other compilers may have more phases. Additionally, one skilled in the art will understand that the operational constraints on a dynamic compiler are much different from the constraints for a static compiler. In particular, the dynamic compiler must be able to very quickly perform an initial compilation on the source program to minimize the program's startup delay.

Figure 1B:
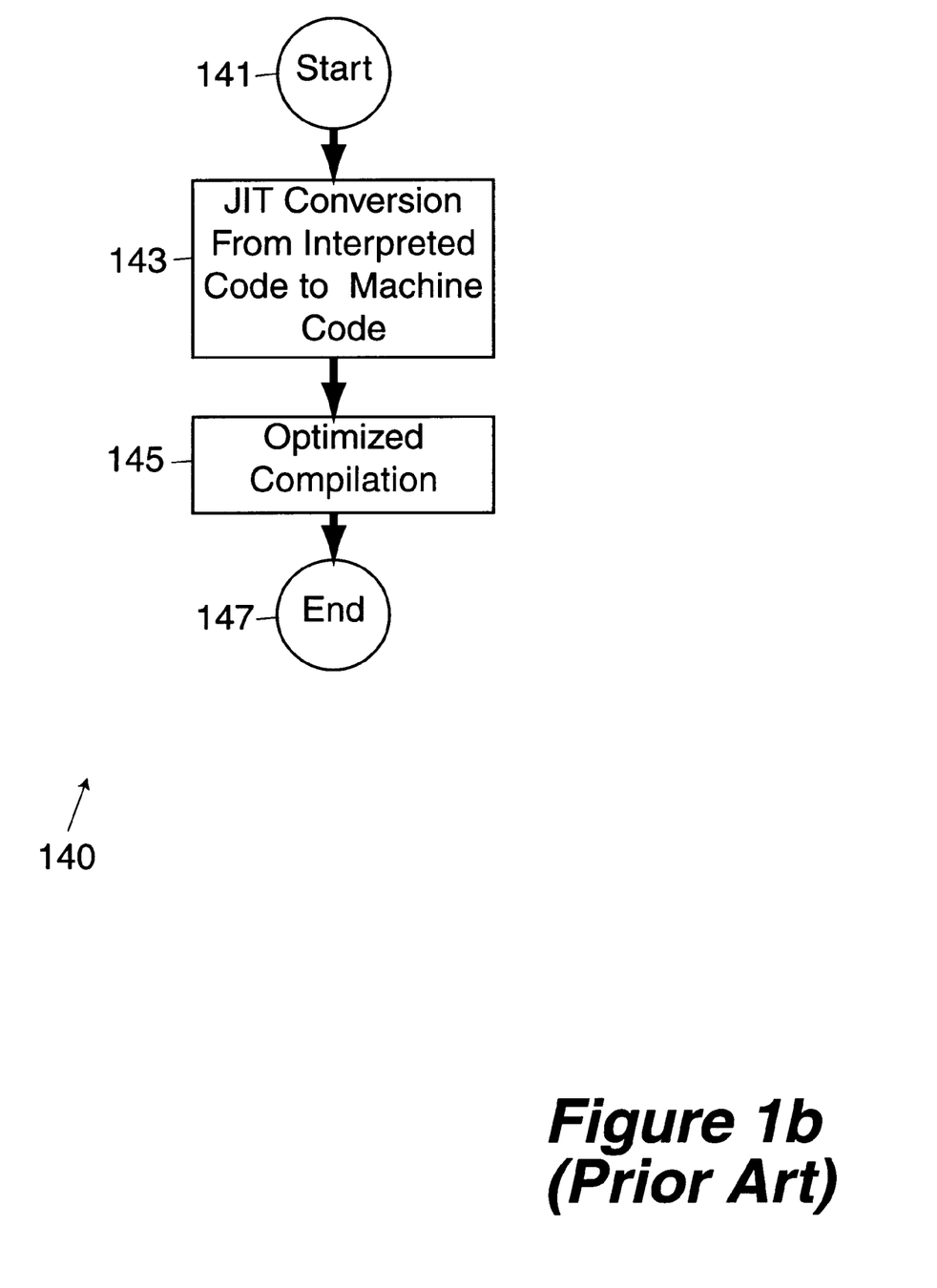

FIG. 1b illustrates a dynamic compilation process, indicated by general reference character 140, that initiates at a 'start' terminal 141 and continues to a 'just-in-time' (JIT) compilation 143. The JIT compilation 143 converts code (such as a Smalltalk or Java "bytecode") into computer instructions (machine code) suitable for direct execution by the computer—that is, instructions compliant with the computer's ABI. Thus, in some dynamic compilation environments, the program initially executes by being interpreted by the virtual machine. Later, the JIT compiler compiles the interpreted code into unoptimized machine code that can be directly executed by the host computer. Other dynamic compilation environments require the JIT compilation 143 step prior to executing the program. In these environments the code is not interpreted. Although performance of the program is greatly improved when the interpreted code is converted to machine code, additional performance improvements can be made if the procedures that are repetitively executed are optimized. Thus, an optimized compilation process 145 recompiles portions of the source program (here the interpreted code) and generates optimized machine code versions of the heavily used portions. The dynamic compilation process 140 completes through an 'end' terminal 147.

The previous description illustrates the prior art. The instant invention improves the performance of compilers by journaling intermediate compiler data (ICD), generated during an initial compilation of the source program, for later reuse by a subsequent compilation of the source program.

Operating Environment

Figure 2:
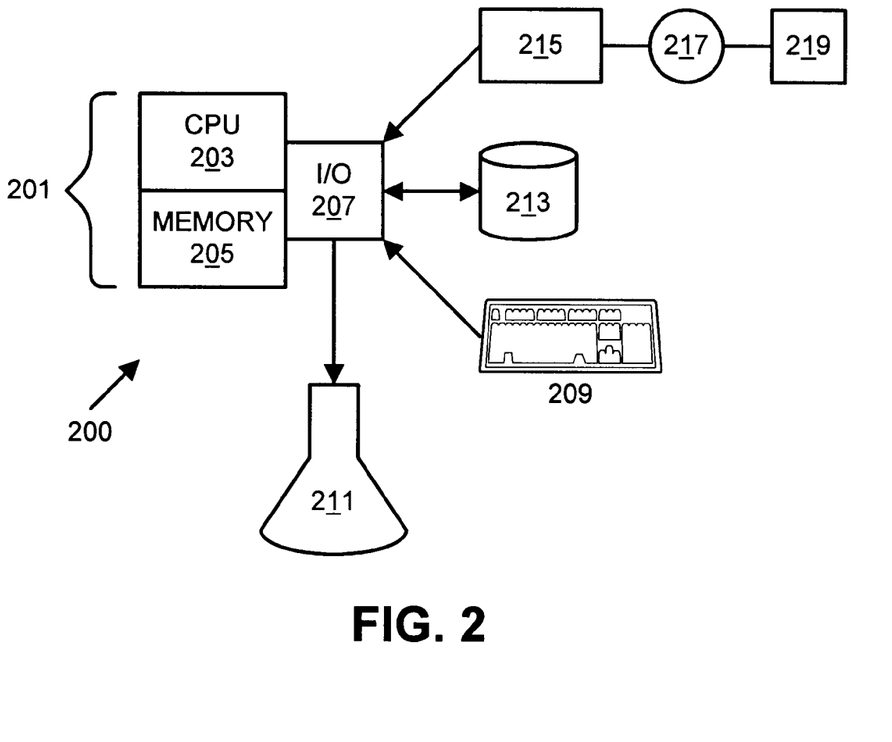
FIG. 2 illustrates a computer system capable of using the invention in accordance with a preferred embodiment.

Some of the elements of a computer, as indicated by general reference character 200, configured to support the invention are shown in FIG. 2 wherein a processor 201 is shown, having a central processor unit (CPU) 203, a memory section 205 and an input/output (I/O) section 207.

The I/O section 207 is connected to a keyboard 209, a display unit 211, a disk storage unit 213 and a CD-ROM drive unit 215. The CD-ROM drive unit 215 can read a CD-ROM medium 217 that typically contains a program and data 219. The CD-ROM drive unit 215, along with the CD-ROM medium 217, and the disk storage unit 213 comprise a filestorage mechanism. One skilled in the art will understand that the CD-ROM drive unit 215 can be replace by any device that can read a removable media that contains the program and data 219. These devices include, but are not limited by, floppy disk drives, removable cartridge drives, and magnetic tape drives. Such a computer system is capable of executing applications that embody the invention.

As previously mentioned, the invention saves to a journal the ICDs generated during an initial compilation of the source program. The journaled information can be kept on the computer's filesystem. Each journal record identifies the compilation unit related to the record. The record also distinguishes when the compilation unit has changed between the initial and subsequent compilations. One skilled in the art will understand that many techniques exist for determining equivalence of the compilation unit. These techniques included, without limitation, comparing the source program of the initial and subsequent compilation unit, calculating a checkword on the source, or relying on the nature of the programming environment (for example knowing that the source will not change while a dynamically compiled program executes). One skilled in the art will also understand that the journaled data is of multiple types dependent on which phase of the compiler generated the ICD. Some of the ICDs are dependent on the architecture of the computer that will execute the target language. Other ICDs only depend on the structure of the source program. Further, for dynamic compilers, run-time based ICDs may be journaled. The run-time based ICDs are used to reproduce the state of a previously run, dynamically compiled program.

Figure 3A:
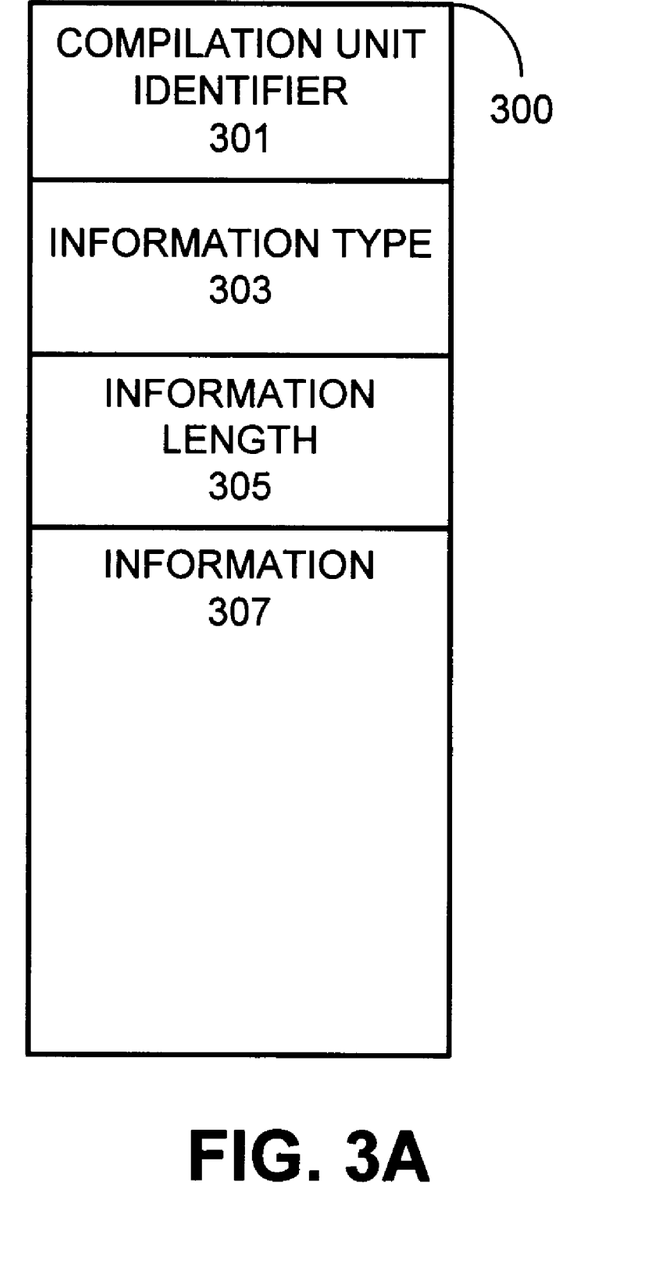
FIG. 3a & 3b illustrate the structure of journal record (3a) and the structure of a journal file produced by a dynamic OOP compiler (3b) in accordance with a preferred embodiment.

FIG. 3a illustrates a journal record, indicated by general reference character 300, created by a preferred embodiment. The journal record 300 includes a 'compilation unit identification' field 301, an 'information type' field 303, an 'information length' field 305, and an 'information' field 307. The 'compilation unit identification' field 301 contains a value that identifies the compilation unit for the journal record 300. This value also identifies which compiler phase generated the journaled data contained in the 'information' field 307. Additionally, this value contains verification information used to verify that the compilation unit has not changed between an initial compilation and a subsequent compilation. One skilled in the art will understand that the verification information can be the source code of compilation unit, the checksum of the source code of the compilation unit or similar information. The 'information type' field 303 contains a value that identifies the type of the information stored in the 'information' field 307. The 'information length' field 305 contains a value that represents the size of the 'information' field 307. The 'information' field 307 contains the actual journaled data. The actual journaled data is of the type specified by the value stored in the 'information type' field 303. The journaled data represents computationally expensive information to recreate. In some circumstances, the data consists of data structures used as input to a compilation phase decision procedure. In other cases the data is the result reached by the compilation phase decision procedure. In yet another case the data is implied optimization data, that results from an optimization decision by an adaptive compiler, that indicates that if one compilation unit is optimized that a second compilation unit should also be optimized. Those skilled in the art will understand that there are other types of data that can be usefully journaled.

A static compiler sequentially writes and reads each of the journal records because the static compiler sequentially and deterministically compiles the source program. However, dynamic compilers compile the source program dependent on the execution path of the program. Thus, a dynamic compiler uses an indexed journal file (or equivalent) to organize the journal indexed to the compilation unit. This approach is used with dynamically compiled object-oriented programming languages.

Figure 3B:
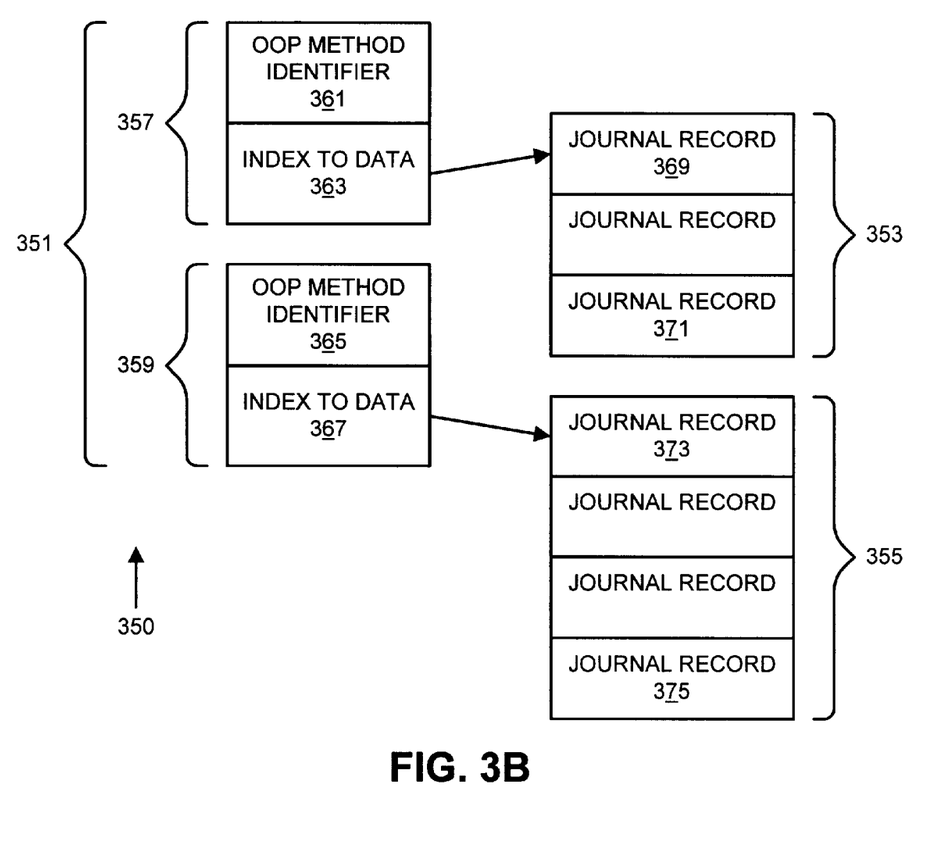

FIG. 3b illustrates a journal file, indicated by general reference character 350, that contains a plurality of index records 351, a first OOP method journal 353, and a second OOP method journal 355. The plurality of index records 351 includes a first index record 357 and a second index record 359. The first index record 357 includes a 'first OOP method identification' field 361 and a 'first OOP method journal index' field 363. The 'first OOP method identification' field 361 contains information that identifies the OOP method that has journaled information stored in the first OOP method journal 353. The 'first OOP method journal index' field 363 contains an index into the journal file 350 that specifies the start of the first OOP method journal 353. The second index record 359 includes a 'second OOP method identification' field 365 and a 'second OOP method journal index' field 367 having the same purpose as the 'first OOP method identification' field 361 and the 'first OOP method journal index' field 363 previously described -but containing different values. The first OOP method journal 353, indexed to by the contents of the 'first OOP method journal index' field 363, includes a 'first journal' record 369 and a 'last journal' record 371. Both the 'first journal' record 369 and the 'last journal' record 371 have the same structure as the journal record 300 previously described. Those skilled in the art will understand that the first OOP method journal 353 may contain zero, one or more journal records. The 'second OOP method journal index' field 367 contains a value that indicates the location of a 'first journal' record 373 in the second OOP method journal 355. The second OOP method journal 355 is completed by a 'last journal' record 375. Thus, the second index record 359 identifies the journal for a second compilation unit.

Figure 4:
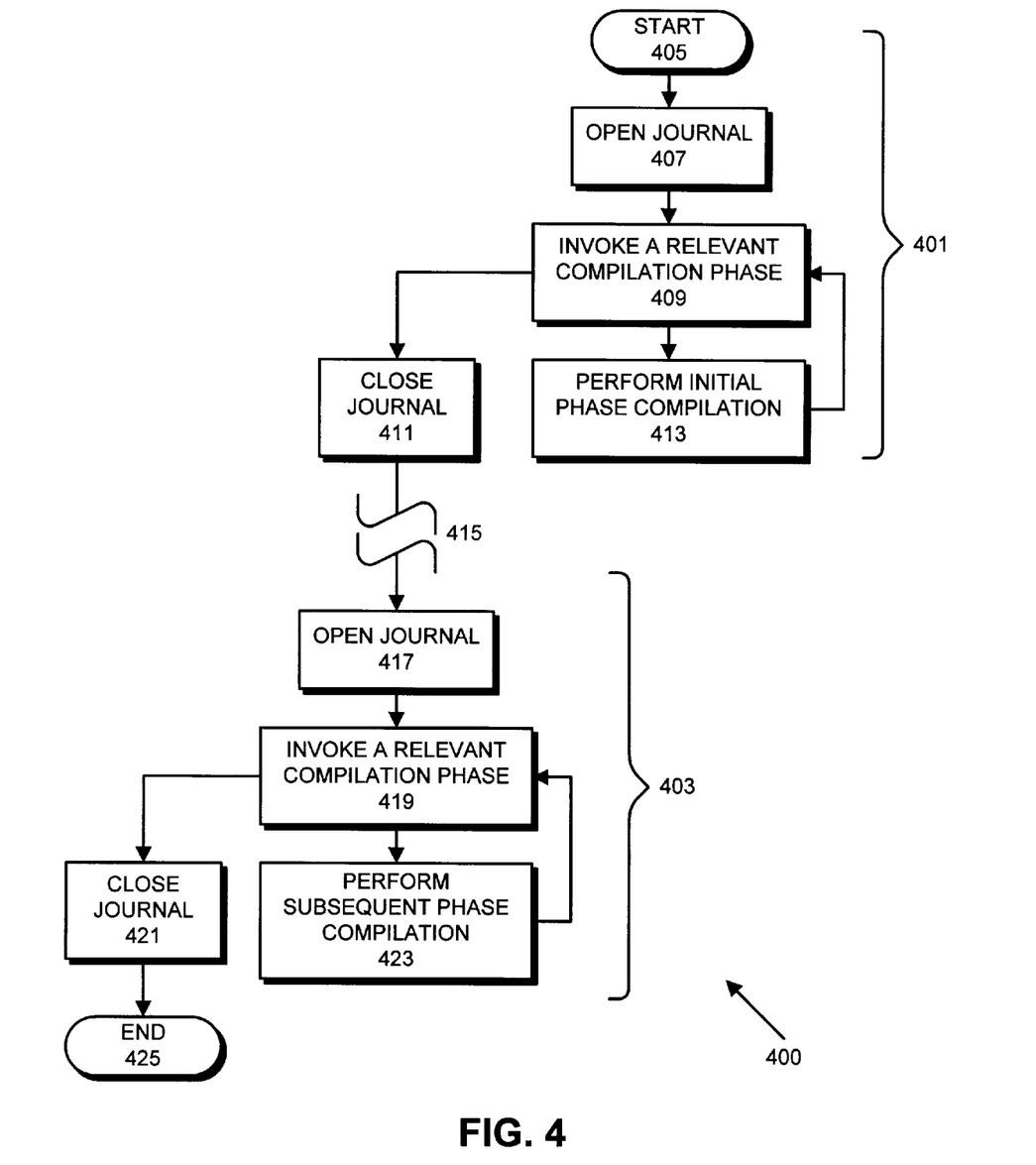
FIG. 4 illustrates the compiler processes used to perform subsequent compilations in accordance with a preferred embodiment.

FIG. 4 illustrates a compilation process, indicated by general reference character 400, that includes an 'initial compilation' process 401 and a 'subsequent compilation' process 403. The compilation process 400 initiates at a 'start' terminal 405 and continues to an 'open journal' procedure 407. The 'open journal' procedure 407 opens a journal file allowing write access to the 'initial compilation' process 401. Next, an 'invoke a relevant compilation phase' procedure 409 invokes a compilation phase on the source program. One example of a compilation phase (there are many more) is the compiler phase that determines the boundaries of basic blocks and the variables that enter, exit and propagate through these boundaries. Once the relevant compilation phases have operated on the source program, the 'initial compilation' process 401 continues to a 'close journal' procedure 411 that closes the journal file. During the 'invoke a relevant compilation phase' procedure 409 a compilation unit is compiled by a 'perform initial compilation' procedure 413 that saves the ICD for the compiled compilation units within the source program. The 'perform initial compilation' procedure 413 is subsequently described with regard to FIG. 5.

The completion of the 'close journal' procedure 411 completes the 'initial compilation' process 401. Sometime later, as indicated by a delay 415, the 'subsequent compilation' process 403 initiates at an 'open journal' procedure 417. The 'open journal' procedure 417 opens the journal file allowing read access to the journal file. Then, an 'invoke a relevant compilation phase' procedure 419 again processes the source program. Once the compilation phase has processed the source program, the 'subsequent compilation' process 403 closes the journal file at a 'close journal' procedure 421. During the 'invoke a relevant compilation phase' procedure 419, the 'subsequent compilation' process 403 compiles the source program at a 'perform subsequent compilation' procedure 423 using the journaled ICD. The 'perform subsequent compilation' procedure 423 is described with regard to FIG. 6. Once the journal file is closed, the compilation process 400 completes through an 'end' terminal 425. One skilled in the art will understand that the subsequent compilation generates its own journal for use by compilations subsequent to the 'subsequent compilation' process 403.

For static compilers, the compilation performed by the 'perform initial compilation' procedure 413 often includes an optimization phase. The journaled ICD includes ICDs relevant to these optimization steps as well as other compute intensive compiler decisions. The 'subsequent compilation' process 403 uses the journaled ICD, where appropriate, to bypass the compute intensive operations made during the 'initial compilation' process 401. Because computation intensive operations are not duplicated, but instead remembered from the 'initial compilation' process 401, the performance of the compiler is improved during the 'subsequent compilation' process 403.

For dynamic compilers, the compilation performed by the 'initial compilation' process 401 generally does not include optimizations or other optional compute intensive operations so as to minimize the initial startup delay due to the compilation. However, a preferred embodiment journals ICDs related to computation intensive decisions made during the 'initial compilation' process 401. Later, during the 'subsequent compilation' process 403, the journaled ICDs can be retrieved and used instead of recreating the related computationally expensive information. Because computation intensive decisions are not recreated, but instead remembered from the 'initial compilation' process 401 the compiler performance improved during the 'subsequent compilation' process 403. One skilled in the art will understand that the journal can be used by the dynamic compiler during a subsequent invocation of the program or during an optimization pass on the program. Further, one skilled in the art will understand that the verification information in the 'information' field 307 need not be used if the dynamic compiler can determine that the source has not changed between the initial and subsequent compilations.

One skilled in the art will understand that in the environment of an adaptive compiler the source program is retained while it executes. Thus, the adaptive compiler is assured (subject to simultaneous development and debugging) that the source program initially compiled is the same as the source program that is optimized.

Figure 5:
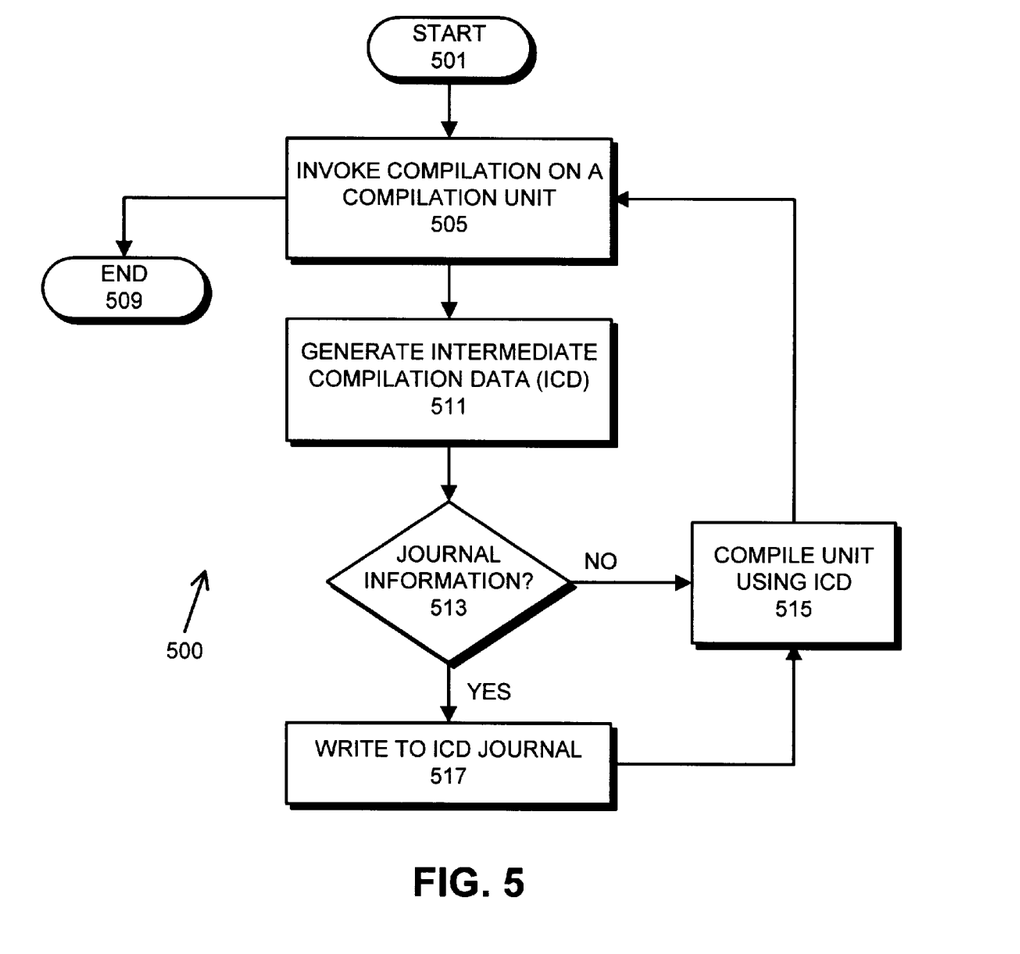
FIG. 5 illustrates the initial phase compilation process that creates the journal in accordance with a preferred embodiment.

FIG. 5 illustrates an 'initial phase compilation' process, indicated by general reference character 500, that initiates at a 'start' terminal 501 after being invoked by the 'invoke a relevant compilation phase' procedure 409 of FIG. 4. The 'initial phase compilation' process 500 continues to an 'invoke compilation of a compilation unit' procedure 505 that processes each compilation unit of the source program.

Once each compilation unit is processed, the 'initial phase compilation' process 500 completes through an 'end' terminal 509. As each compilation unit is processed, a 'generate intermediate compilation data' procedure 511 computes intermediate compilation data that is used either as input to a compilation decision or is a result of a compilation decision. Next, a 'journal ICD' decision procedure 513 determines whether the ICD is to be journaled. If the ICD is not to be journaled, the 'initial phase compilation' process 500 continues to a 'compile compilation unit' procedure 515 that uses the ICD to compile the compilation unit. However, if the ICD is to be journaled, the 'initial phase compilation' process 500 continues to a 'write ICD to journal' procedure 517 that generates the values stored in the 'compilation unit identification' field 301, the 'information type' field 303, the 'information length' field 305 and the 'information' field 307 of the journal record 300 and writes these values to the journal. Next, the 'initial phase compilation' process 500 continues to the 'compile compilation unit' procedure 515 that compiles the compilation unit. Once the compilation unit is compiled, the 'initial phase compilation' process 500 processes the next compilation unit. One skilled in the art will understand that for dynamic compilers (or other compilers that have an non-deterministic compilation order) the 'write ICD to journal' procedure 517 includes the capability of adding an index record to the journal.

The 'journal ICD' decision procedure 513 determines which computationally expensive compiler operations generate ICDs to be journaled. The 'journal ICD' decision procedure 513 is programmed using heuristics to determine which ICDs should be journaled.

Figure 6:
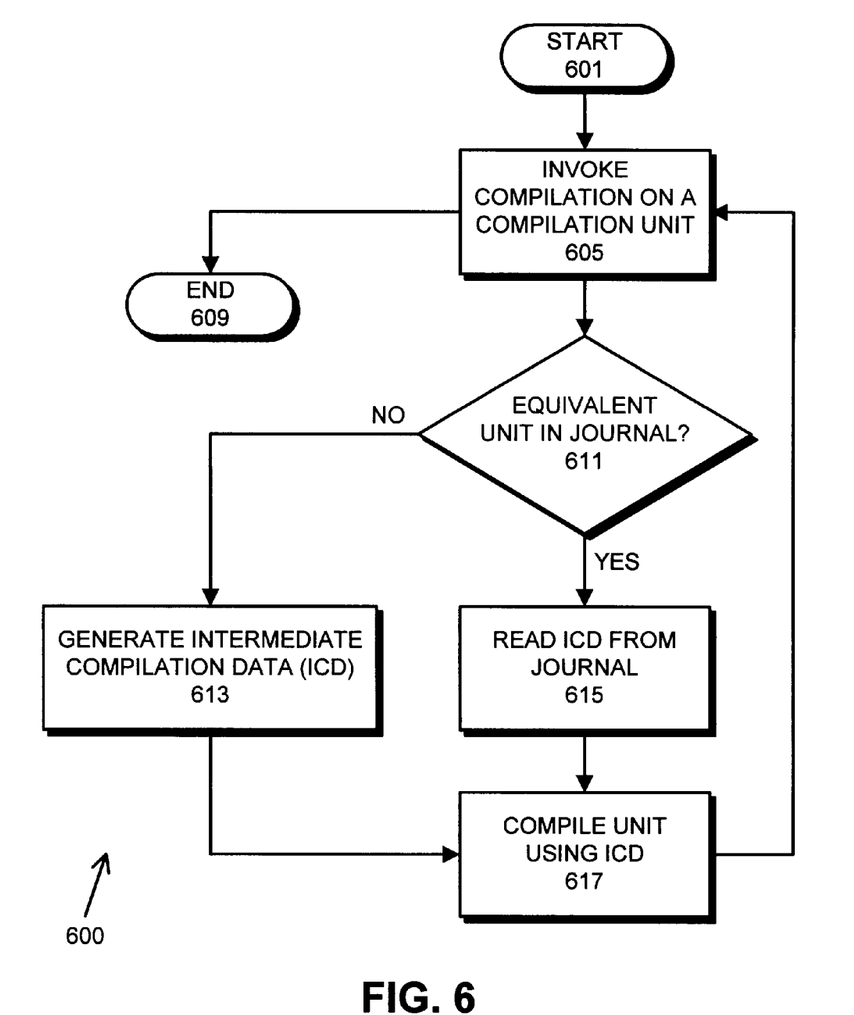
FIG. 6 illustrates the subsequent phase compilation process that uses the journal in accordance with a preferred embodiment.

FIG. 6 illustrates a 'subsequent phase compilation' process, indicated by general reference character 600, that initiates at a 'start' terminal 601 from the 'perform subsequent compilation' procedure 423 of FIG. 4. The 'subsequent phase compilation' process 600 continues to an 'invoke compilation of a compilation unit' 605 process that sequentially processes each compilation unit of the source program. After all compilation units have been processed, the 'subsequent phase compilation' process 600 completes through an 'end' terminal 609. As each compilation unit is processed an 'equivalent unit in journal' decision procedure 611 determines whether the compilation unit in the source program, currently being compiled, is equivalent to the compilation unit processed by the 'initial phase compilation' process 500 (by using the verification data stored in the 'information' field 307) and whether any ICD is journaled for the compilation unit. If the 'equivalent unit in journal' decision procedure 611 determines that the compilation units are not equivalent or that no information for the compilation unit has been journaled, the 'subsequent phase compilation' process 600 continues to a 'generate intermediate compilation data' procedure 613. The 'generate intermediate compilation data' procedure 613 generates the ICD for the compiler phase operating on the compilation unit. As previously mentioned, the ICDs can depend upon the ABI. The 'equivalent unit in journal' decision procedure 611 also determines whether the ABI for the ICD matches the target ABI.

However, if the 'equivalent unit in journal' decision procedure 611 determines that the completion units are equivalent and the journal contains an ICD for the compilation unit, the 'subsequent phase compilation' process 600 continues to a 'read ICD data from journal' procedure 615 that reads the ICD from the journal instead of computing the ICD. This avoids computationally expensive operations. Regardless of the decision made by the 'equivalent unit in journal' decision procedure 611, the ICD (created by the 'generate intermediate compilation data' procedure 613 or read from by journal by the 'read ICD data from journal' procedure 615) is used by a 'compile compilation unit' procedure 617. Once the compilation unit is processed by the compilation phase, the next compilation unit is processed at the 'invoke compilation of a compilation unit' 605.

Those skilled in the art will understand that the determinations made by the 'journal ICD' decision procedure 513 and the 'equivalent unit in journal' decision procedure 611 are dependent on the processing speed, journaled data access speed, and other aspects of the computer executing the compiler. Those skilled in the art will also understand that these decisions can be heuristically programmed based on measured parameters. These measurements are made by instrumenting a compiler to gather information about the decisions made during each compilation phase and then compiling a sufficient number of representative programs. These measurements are then used to program the 'journal ICD' decision procedure 513 and the 'equivalent unit in journal' decision procedure 611 for a specific computer programming language and computing system environment. One skilled in the art will understand that the invention, as previously described, teaches a method, apparatus and programming product that improves the compilation speed of a subsequent compilation of a source program that was previously compiled.

Although the present invention has been described in terms of the presently preferred embodiments, one skilled in the art will understand that various modifications and alterations may be made without departing from the scope of the invention. Accordingly, the scope of the invention is not to be limited to the particular invention embodiments discussed herein, but should be defined only by the appended claims and equivalents thereof.

What is claimed is:

1. A computer controlled method for improving performance of a compiler, said method comprising the steps of:

(a) performing an initial compilation of said source program;

(b) creating said intermediate compilation datum associated with said specific compilation phase performed during said initial compilation;

(c) saving said intermediate compilation datum as said first journaled datum;

(d) recompiling a source program during a subsequent compilation; and (e) using a first journaled datum in lieu of recreating an intermediate compilation datum associated with a specific compilation phase during said subsequent compilation;

wherein said source program is an object-oriented program;

wherein said intermediate compilation datum represents an optimization decision datum;

wherein said optimization decision datum comprises a target application-binary-interface dependent information.

2. A computer controlled method for improving performance of a compiler, said method comprising the steps of:

(a) performing an initial compilation of said source program;

(b) creating said intermediate compilation datum associated with said specific compilation phase performed during said initial compilation;

(c) saving said intermediate compilation datum as said first journaled datum;

(d) recompiling a source program during a subsequent compilation; and (e) using a first journaled datum in lieu of recreating an intermediate compilation datum associated with a specific compilation phase during said subsequent compilation;

wherein said compiler is a dynamic compiler having a non-optimization mode and an optimization mode, said non-optimization mode being active during said initial compilation, said optimization mode being active during said subsequent compilation;

wherein said dynamic compiler is an adaptive compiler, said source program includes a first portion and a second portion, and said first journaled datum is an implied optimization datum specifying that said second portion is to be optimized dependent on whether said first portion is optimized.

3. A computer controlled method for improving performance of a compiler, said method comprising the steps of:

(a) performing an initial compilation of said source program;

(b) creating said intermediate compilation datum associated with said specific compilation phase performed during said initial compilation;

(c) saving said intermediate compilation datum as said first journaled datum;

(d) recompiling a source program during a subsequent compilation; and (e) using a first journaled datum in lieu of recreating an intermediate compilation datum associated with a specific compilation phase during said subsequent compilation;

wherein said compiler is a dynamic compiler compiling said source program for an executable program while said executable program executes, said executable program having a state, and said method further comprises steps of, (b1) creating a different intermediate compilation datum during said initial compilation, said intermediate compilation datum and said different intermediate compilation datum defining said state, and (c1) saving said different intermediate compilation datum as a second journaled datum saved subsequent to said first journaled datum;

wherein step (e) comprises using said first journaled datum and said second journaled datum in lieu of recreating said intermediate compilation datum and said different intermediate compilation datum during said subsequent compilation to recreate said state.

4. An apparatus having a central processing unit (CPU) and a memory coupled to said CPU for compiling a source program by a compiler, wherein said apparatus comprises:

a first compilation mechanism, within said compiler, configured to perform an initial compilation of said source program;

a first data generation mechanism configured to create said intermediate compilation datum associated with said specific compilation phase performed during said initial compilation;

a first journal storage mechanism configured to save said intermediate compilation datum as said first journaled datum;

a recompilation mechanism, within said compiler, configured to recompile said source program during a subsequent compilation; and a journal utilization mechanism configured to use a first journaled datum in lieu of recreating an intermediate compilation datum associated with a specific compilation phase during said subsequent compilation;

wherein said intermediate compilation datum represents an optimization decision datum;

wherein said optimization decision datum comprises a target application-binary-interface dependent information.

5. An apparatus having a central processing unit (CPU) and a memory coupled to said CPU for compiling a source program by a compiler, wherein said apparatus comprises:

a first compilation mechanism, within said compiler, configured to perform an initial compilation of said source program;

a first data generation mechanism configured to create said intermediate compilation datum associated with said specific compilation phase performed during said initial compilation;

a first journal storage mechanism configured to save said intermediate compilation datum as said first journaled datum;

a recompilation mechanism, within said compiler, configured to recompile said source program during a subsequent compilation; and a journal utilization mechanism configured to use a first journaled datum in lieu of recreating an intermediate compilation datum associated with a specific compilation phase during said subsequent compilation;

wherein said compiler is a dynamic compiler having a non-optimization mode and an optimization mode, said non-optimization mode being active during said initial compilation, said optimization mode being active during said subsequent compilation;

wherein said dynamic compiler is an adaptive compiler, said source program includes a first portion and a second portion, and said first journaled datum is an implied optimization datum specifying that said second portion is to be optimized dependent on whether said first portion is optimized.

6. An apparatus having a central processing unit (CPU) and a memory coupled to said CPU for compiling a source program by a compiler, wherein said apparatus comprises:

a first compilation mechanism, within said compiler, configured to perform an initial compilation of said source program;

a first data generation mechanism configured to create said intermediate compilation datum associated with said specific compilation phase performed during said initial compilation;

a first journal storage mechanism configured to save said intermediate compilation datum as said first journaled datum;

a recompilation mechanism, within said compiler, configured to recompile said source program during a subsequent compilation; and a journal utilization mechanism configured to use a first journaled datum in lieu of recreating an intermediate compilation datum associated with a specific compilation phase during said subsequent compilation;

wherein said compiler is a dynamic compiler compiling said source program for an executable program while said executable program executes, said executable program having a state, and wherein said apparatus further comprises, a second compilation mechanism configured to create a different intermediate compilation datum related to said source program during said initial compilation, said intermediate compilation datum and said different intermediate compilation datum defining said state, and a second journal storage mechanism configured to save said different intermediate compilation datum as a second journaled datum saved subsequent to said first journaled datum;

wherein said journal utilization mechanism comprises a recreate state mechanism configured to recreate said state by sequentially using said first journaled datum and said second journaled datum in lieu of recreating said intermediate compilation datum and said different intermediate compilation datum during said subsequent compilation.

7. A computer program product comprising:

a computer usable storage medium having computer readable code embodied therein for causing a computer to compile a source program using a compiler, and said computer readable code comprising:

computer readable program code devices configured to cause said computer to effect a first compilation mechanism, within said compiler, configured to perform an initial compilation of said source program;

computer readable program code devices configured to cause said computer to effect a first data generation mechanism configured to create said intermediate compilation datum associated with said specific compilation phase performed during said initial compilation; and computer readable program code devices configured to cause said computer to effect a first journal storage mechanism configured to save said intermediate compilation datum as said first journaled datum;

computer readable program code devices configured to cause said computer to effect a recompilation mechanism, within said compiler, configured to recompile a source program during a subsequent compilation; and computer readable program code devices configured to cause said computer to effect a journal utilization mechanism configured to use a first journaled datum in lieu of recreating an intermediate compilation datum associated with a specific compilation phase during said subsequent compilation;

wherein said intermediate compilation datum represents an optimization decision datum;

wherein said optimization decision datum comprises a target application-binary-interface dependent information.

8. A computer program product comprising:

a computer usable storage medium having computer readable code embodied therein for causing a computer to compile a source program using a compiler, and said computer readable code comprising:

computer readable program code devices configured to cause said computer to effect a first compilation mechanism, within said compiler, configured to perform an initial compilation of said source program;

computer readable program code devices configured to cause said computer to effect a first data generation mechanism configured to create said intermediate compilation datum associated with said specific compilation phase performed during said initial compilation; and computer readable program code devices configured to cause said computer to effect a first journal storage mechanism configured to save said intermediate compilation datum as said first journaled datum;

computer readable program code devices configured to cause said computer to effect a recompilation mechanism, within said compiler, configured to recompile a source program during a subsequent compilation; and computer readable program code devices configured to cause said computer to effect a journal utilization mechanism configured to use a first journaled datum in lieu of recreating an intermediate compilation datum associated with a specific compilation phase during said subsequent compilation;

wherein said compiler is a dynamic compiler compiling said source program for an executable program while said executable program executes, said executable program having a state, and wherein said product further comprises, computer readable program code devices configured to cause said computer to effect a second compilation mechanism configured to create a different intermediate compilation datum related to said source program during said initial compilation, said intermediate compilation datum and said different intermediate compilation datum defining said state; and computer readable program code devices configured to cause said computer to effect a second journal storage mechanism configured to save said different intermediate compilation datum as a second journaled datum saved subsequent to said first journaled datum;

wherein said journal utilization mechanism comprises computer readable program code devices configured to cause said computer to effect a recreate state mechanism configured to recreate said state by sequentially using said first journaled datum and said second journaled datum in lieu of recreating said intermediate compilation datum and said different intermediate compilation datum during said subsequent compilation.

* * * * *